(12) United States Patent
Shao et al.

(10) Patent No.: US 11,436,942 B2
(45) Date of Patent: Sep. 6, 2022

(54) SYSTEMS AND METHODS FOR INTERACTIVE BRAILLE DISPLAY

(71) Applicant: FMR LLC, Boston, MA (US)

(72) Inventors: Changjiu Shao, Dalian (CN); Yanyu Xu, Dalian (CN); Hongbing Gu, Dalian (CN); Ke Yang, Dalian (CN)

(73) Assignee: FMR LLC, Boston, MA (US)

( * ) Notice: Subject to any disclaimer, the term of this patent is extended or adjusted under 35 U.S.C. 154(b) by 996 days.

(21) Appl. No.: 16/162,221

(22) Filed: Oct. 16, 2018

(65) Prior Publication Data

US 2020/0118462 A1  Apr. 16, 2020

(51) Int. Cl.
| | |
|---|---|
| *G09B 21/00* | (2006.01) |
| *G06K 9/00* | (2022.01) |
| *G06Q 40/06* | (2012.01) |
| *H04M 1/72481* | (2021.01) |

(52) U.S. Cl.
CPC ............. *G09B 21/004* (2013.01); *G06K 9/00* (2013.01); *G09B 21/005* (2013.01); *G09B 21/007* (2013.01); *G06Q 40/06* (2013.01); *H04M 1/72481* (2021.01)

(58) Field of Classification Search
CPC .... G09B 21/003; G09B 21/004; G09B 21/02; G09B 21/007; G09B 21/00; G09B 21/001; G09B 21/025; G09B 21/002; G09B 21/005; G06K 9/00; G06Q 40/06; H04M 1/72481; H04M 1/0254
See application file for complete search history.

(56) References Cited

U.S. PATENT DOCUMENTS

| | | |
|---|---|---|
| 5,557,269 A | 9/1996 | Montane |
| 5,580,251 A | 12/1996 | Gilkes et al. |
| 6,140,913 A | 10/2000 | Okada et al. |
| 6,636,202 B2 | 10/2003 | Ishmael, Jr. et al. |

(Continued)

FOREIGN PATENT DOCUMENTS

| | | | | |
|---|---|---|---|---|
| EP | 1850305 A2 | * | 10/2007 | ........... G09B 21/003 |
| JP | 2013513886 A | * | 4/2013 | |

(Continued)

OTHER PUBLICATIONS

Development of a Braille Display using Piezoelectric Linear Motors by Hyun-Cheol Cho in SICE-ICASE International Joint Conference (Year: 2006).*

(Continued)

*Primary Examiner* — Nizar N Sivji
(74) *Attorney, Agent, or Firm* — Proskauer Rose LLP

(57) ABSTRACT

An interactive braille display system includes a processor and a display unit in electronic communication with the processor. The display unit includes a braille cell unit and an interactive unit in physical contact with the braille cell unit. The interactive unit includes a surface layer for displaying braille information and sensing tactile contact by a user. The interactive unit also includes a subsurface layer in physical communication with the surface layer, the subsurface layer including electrodes for detecting a capacitance change caused by the tactile contact by the user. The capacitance change corresponds to a position of the tactile contact by the user.

30 Claims, 10 Drawing Sheets

(56) References Cited

U.S. PATENT DOCUMENTS

| | | | |
|---|---|---|---|
| 6,743,021 B2* | 6/2004 | Prince | G09B 21/003 434/112 |
| 7,106,220 B2 | 9/2006 | Gourgey et al. | |
| 8,717,151 B2* | 5/2014 | Forutanpour | G06F 3/04847 340/407.1 |
| 8,717,326 B2 | 5/2014 | Ciesla | |
| 9,524,655 B1* | 12/2016 | Campos de Leon | G09B 21/005 |
| 2004/0175676 A1* | 9/2004 | Yang | G09B 21/004 434/112 |
| 2004/0239617 A1* | 12/2004 | Hardwick | G09B 21/003 345/184 |
| 2007/0229233 A1 | 10/2007 | Dort | |
| 2009/0220923 A1* | 9/2009 | Smith | G09B 21/003 434/113 |
| 2010/0055651 A1* | 3/2010 | Rantala | G09B 21/003 434/114 |
| 2011/0025602 A1* | 2/2011 | Sivan | G09B 21/003 340/407.2 |
| 2012/0315605 A1* | 12/2012 | Cho | G09B 21/003 434/114 |
| 2015/0037763 A1* | 2/2015 | Yang | G09B 21/004 434/115 |
| 2015/0262509 A1* | 9/2015 | Labbe | G09B 21/004 434/113 |
| 2015/0331528 A1* | 11/2015 | Robinson | G06F 3/0482 345/173 |
| 2016/0018890 A1* | 1/2016 | Deokar | G06F 3/0488 715/702 |
| 2016/0034180 A1* | 2/2016 | Labbé | G06F 3/0219 345/173 |
| 2017/0316717 A1* | 11/2017 | Aly | G06F 3/0416 |
| 2017/0372636 A1* | 12/2017 | Shah | G09B 21/004 |
| 2018/0342176 A1* | 11/2018 | Califorrniaa | G09B 21/004 |
| 2019/0066536 A1* | 2/2019 | Dooley | G09B 21/003 |

FOREIGN PATENT DOCUMENTS

| | | | | |
|---|---|---|---|---|
| KR | | 101860470 B1 * | 8/2016 | |
| WO | WO-2020013902 A9 * | | 2/2020 | G09B 21/003 |

OTHER PUBLICATIONS

Motion Detection Using Tactile Sensors Based on Pressure-Sensitive Transistor Arrays (Year: 2020).*

Design of a tactile display based on a high power CMUT array—2012 (Year: 2012).*

Tacsac: A Wearable Haptic Device with Capacitive Touch-Sensing Capability for Tactile Display—2020 (Year: 2020).*

* cited by examiner

1120

1140

SYSTEMS AND METHODS FOR INTERACTIVE BRAILLE DISPLAY

TECHNICAL FIELD

This application relates generally to systems, methods and apparatuses, including computer programs, for displaying braille information. More specifically, this application relates to interactive braille displays that convey a range of useful information to blind individuals.

BACKGROUND

According to one World Health Organization publication, "Global Data on Visual Impairments 2010," there are about 39 million blind individuals around the world. Many of these individuals use braille displays to obtain information, e.g., to read books or news articles. Typical braille displays include a grid of braille dots each having two states, "raised" and "lowered," that form braille characters by arranging different combinations of states among the dots. However, such displays typically can show only one or two lines of braille text at a time, severely constraining the amount and type of information that can be conveyed to the user.

As a result, these displays are left without an effective way to display more complex information types, e.g., chart or graph data. This limitation makes it particularly difficult for blind individuals to understand data in the area of financial investments, which frequently conveys trends over time (e.g., stock price) using charts and graphs. In this area and others, blind individuals may be unable to obtain sufficient information to make fully informed decisions (e.g., investment decisions).

Current braille displays are also limited in their interactivity. Although braille display systems do typically have user input keys with specific functions, the braille display area itself is typically read-only and provides no ability to interact directly with the user (in comparison to, for example, smartphones, which permit touch interactions to occur via a touchscreen).

SUMMARY

Accordingly, the invention provides systems, methods and apparatuses to display an expanded range of information on a braille display for use by blind individuals. Touch technology associated with mobile phones can be integrated directly into the braille display, enabling blind individuals to interact with the display using a wider range of actions than the prior art provides. For example, users can now interact with the braille display by tapping, double-clicking, sliding, or making other special gestures or multiple finger actions that smartphones permit. Such abilities can provide an enhanced and more satisfying interactive experience to blind individuals while also providing better access to more complete information.

For example, the present invention permits complex chart data to be broken down and re-packaged in ways that are more readily understandable to blind individuals. One approach is to separate chart data having two or more data series into multiple screens, each displaying one data series, to help blind individuals better distinguish them. Another approach is to separate two or more series of data displayed on a pie chart into two or more corresponding bar graphs, thus enabling an easier comparison by blind individuals. Graph content can also become interactive (e.g., the user can zoom in or out, scroll to the left or right, or be read values aloud by a speaker, for example values associated with a certain graph position). All of these functions and more can be accomplished via one or more intuitive touch interactions directly within the braille display unit itself.

In one aspect, the invention features an interactive braille display system. The interactive braille display system includes a processor and a display unit in electronic communication with the processor. The display unit includes a braille cell unit and an interactive unit in physical contact with the braille cell unit. The interactive unit includes a surface layer for displaying braille information and sensing tactile contact by a user. The interactive unit also includes a subsurface layer in physical communication with the surface layer. The subsurface layer includes electrodes for detecting a capacitance change caused by the tactile contact by the user. The capacitance change corresponds to a position of the tactile contact by the user.

In some embodiments, the subsurface layer includes first and second electrodes spaced along a first axis and third and fourth electrodes spaced along a second axis, the first axis perpendicular to the second axis, the first and second axes defining a surface plane of the subsurface layer. In some embodiments, the interactive unit includes a set of bores sized to at least partially surround a corresponding set of protuberances of the braille cell unit, each protuberance in the set of protuberances capable of assuming a raised state or a lowered state. In some embodiments, the display unit is configured to display three or more lines of braille text. In some embodiments, the tactile contact is at least one of a tap, a double-click, a slide, a swipe, a flick, or a pinch by the user.

In some embodiments, the processor is configured to receive the capacitance change detected by the subsurface layer and to generate an electronic output. In some embodiments, the electronic output is usable to assist the user in understanding information displayed by the display unit. In some embodiments, the information is investment or financial data. In some embodiments, the information is chart data. In some embodiments, the chart data has two or more chart data series and the processor is configured to display each chart data series separately.

In some embodiments, the chart data includes a line graph having two or more lines and the processor is configured to display each line individually on the display unit. In some embodiments, the chart data includes a pie chart and the processor is configured to convert the pie chart data to bar chart data for display on the display unit. In some embodiments, the processor is configured to generate a magnified display of the chart data responsive to the tactile contact of the user.

In some embodiments, the processor is configured to cause the display unit to pan within the chart responsive to a user command. In some embodiments, the system includes a speaker in electrical communication with the processor. The processor can be configured to provide to the speaker audio explaining the braille information. In some embodiments, the system includes a braille keyboard in electrical communication with the processor. The braille keyboard can include multiple function keys for receiving additional user input. In some embodiments, the braille cell unit includes an electroactive polymer for displaying braille text and the interactive unit uses projected capacitive technology for receiving the tactile contact by the user. In some embodiments, the surface layer includes a plastic material. In some embodiments, each protuberance is enclosed by four points of intersection formed on a rectangular electrode grid. In some embodiments, the system includes a microphone in electrical communication with the processor. In some embodiments, the microphone is configured to receive a user voice command, the processor configured to produce an output responsive to the voice command.

In another aspect, the invention features a computerized method of displaying braille information on a display unit having a braille cell and an interactive unit in physical contact with the braille cell. The computerized method includes detecting, by a subsurface layer of the display unit, a capacitance change caused by tactile contact of a user with a surface layer of the display unit, the subsurface layer in physical communication with the surface layer. The computerized method also includes generating, by the processor, an output based on the tactile input. The capacitance change corresponds to a position of the tactile contact by the user.

In some embodiments, the subsurface layer includes first and second electrodes spaced along a first axis and third and fourth electrodes spaced along a second axis, the first axis perpendicular to the second axis, the first and second axes defining a surface plane of the subsurface layer. In some embodiments, the interactive unit includes a set of bores sized to at least partially surround a corresponding set of protuberances of the braille cell unit, each protuberance in the set of protuberances capable of assuming a raised state or a lowered state. In some embodiments, the display unit is configured to display three or more lines of braille text. In some embodiments, the tactile contact is at least one of a tap, a double-click, a slide, a swipe, a flick, or a pinch by the user.

In some embodiments, the processor is configured to receive the capacitance change detected by the subsurface layer and to generate an electronic output. In some embodiments, the electronic output is usable to assist the user in understanding information displayed by the display unit. In some embodiments, the information is investment or financial data. In some embodiments, the information is chart data. In some embodiments, the chart data has two or more chart data series and the processor is configured to display each chart data series separately. In some embodiments, the chart data includes a line graph having two or more lines and the processor is configured to display each line individually on the display unit. In some embodiments, the chart data includes a pie chart and the processor is configured to convert the pie chart data to bar chart data for display on the display unit. In some embodiments, the processor is configured to generate a magnified display of the chart data responsive to the tactile contact of the user.

In some embodiments, the processor is configured to cause the display unit to pan within the chart responsive to a user command. In some embodiments, there is a speaker in electrical communication with the processor. In some embodiments, the processor is configured to provide to the speaker audio explaining the braille information. In some embodiments, there is a braille keyboard in electrical communication with the processor. In some embodiments, the braille keyboard includes multiple function keys for receiving additional user input. In some embodiments, the braille cell unit includes an electroactive polymer for displaying braille text and the interactive unit uses projected capacitive technology for receiving the tactile contact by the user. In some embodiments, the surface layer includes a plastic material. In some embodiments, each protuberance is enclosed by four points of intersection formed on a rectangular electrode grid. In some embodiments, there is a microphone in electrical communication with the processor. In some embodiments, the microphone is configured to receive a user voice command and the processor is configured to produce an output responsive to the voice command.

By virtue of the above systems, methods, apparatuses, and those further described below, the invention provides a novel solution to enhance the experience of blind individuals interacting with braille display systems and receiving more complete information more easily and intuitively.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

DETAILED DESCRIPTION

Figure 1:
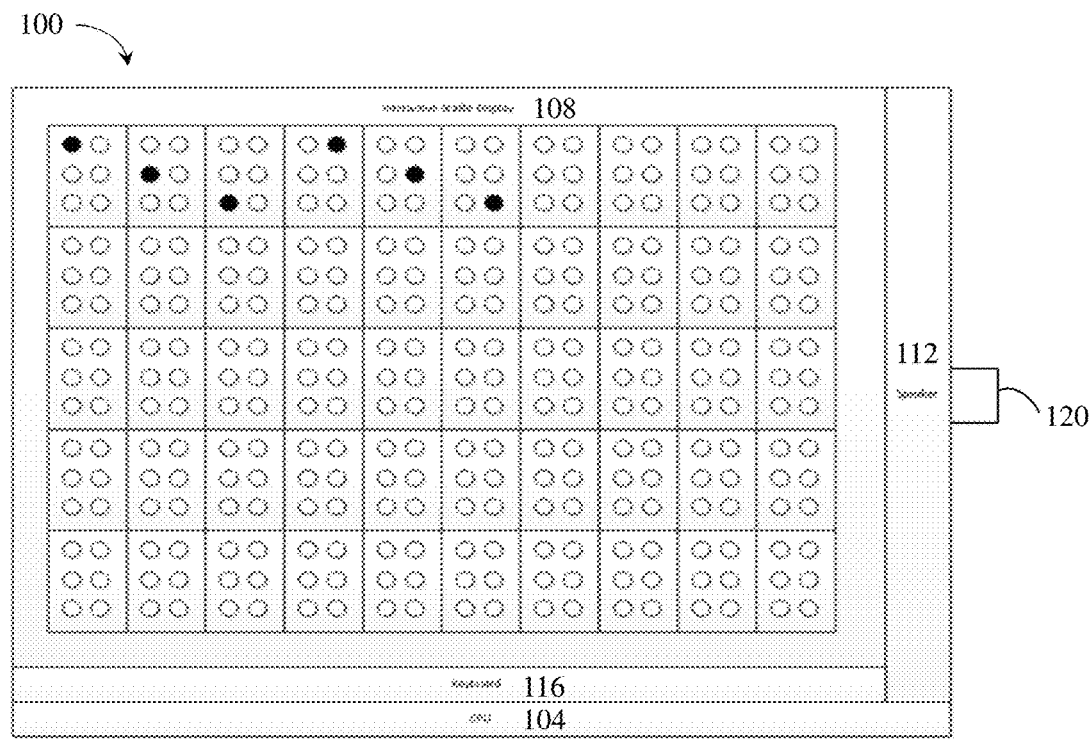
FIG. 1 is a schematic diagram of an interactive braille display system, according to an illustrative embodiment of the invention.

FIG. 1 is a schematic diagram of an interactive braille display system 100, according to an illustrative embodiment of the invention. The interactive braille display system 100 includes a processor 104 (e.g., a central processing unit) and a display unit 108 (e.g., an interactive braille display unit) in electronic communication with the processor 104. The display unit 108 includes a braille cell unit and an interactive unit in physical contact with the braille cell unit (e.g., as shown in greater detail in FIGS. 5A-5B below). The interactive braille display system 100 can also include a speaker 112 in electrical communication with the processor 104, and/or a braille keyboard 116 in electrical communication with the processor 104. The braille keyboard 116 can include multiple function keys (e.g., as shown in greater detail in FIG. 7 below) for receiving additional user input and can increase the interactivity of the braille display system 100.

The processor 104 can be configured to process input received (e.g., via touching the display unit 108 or pressing keys of the braille keyboard 116) and to provide output (e.g., providing the speaker 112 with audio, such as reading explanation of one or more aspects of displayed braille information or providing braille text or chart data). The interactive braille display system 100 can also include a microphone 120 in electrical communication with the processor 104. The microphone 120 can be configured to receive a user voice command and relay it to the processor 104, and the processor 104 can be configured to produce an output responsive to the voice command, e.g., audio provided to the speaker 112.

Figures 2A, 2B, 2C, 2D:
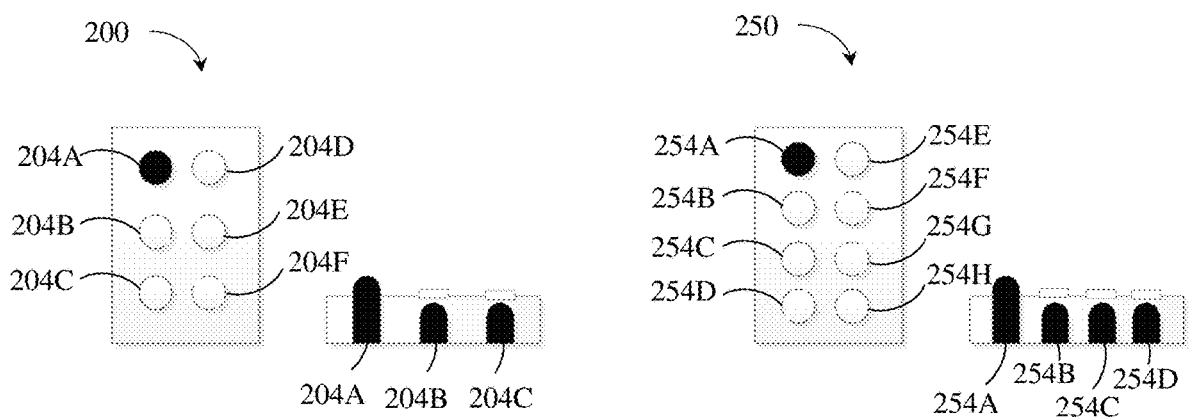
FIG. 2A is a top view of a braille display cell having six braille dots, according to an illustrative embodiment of the invention.
FIG. 2B is a left side view of the braille display cell of FIG. 2A, according to an illustrative embodiment of the invention.
FIG. 2C is a top view of a braille display cell having eight braille dots, according to an illustrative embodiment of the invention.
FIG. 2D is a left side view of the braille display cell of FIG. 2C, according to an illustrative embodiment of the invention.

FIG. 2A is a top view of a braille display cell 200 having six braille dots 204A-F, according to an illustrative embodiment of the invention, and FIG. 2B is a left side view of the braille display cell of FIG. 2A. Each braille dot 204A-F can take either a raised or a lowered position. For example, braille dot 204A is in a raised position, while braille dots 204B-F are in a lowered position. Similarly, FIG. 2C is a top view of a braille display cell having eight braille dots 254A-F, according to an illustrative embodiment of the invention, and FIG. 2D is a left side view of the braille display cell of FIG. 2C. As in FIGS. 2A-2B, each braille dot 254A-F can take either a raised position (as adopted by braille dot 254A) or a lowered position (as adopted by braille dots 254B-H). Different combinations of raised and lowered states can represent different braille characters or other information. A braille display unit can include multiple braille display cells, e.g., a grid of 50 cells arranged in 5 rows of 10 cells each, as shown in FIG. 1.

Figures 3A, 3B, 3C:
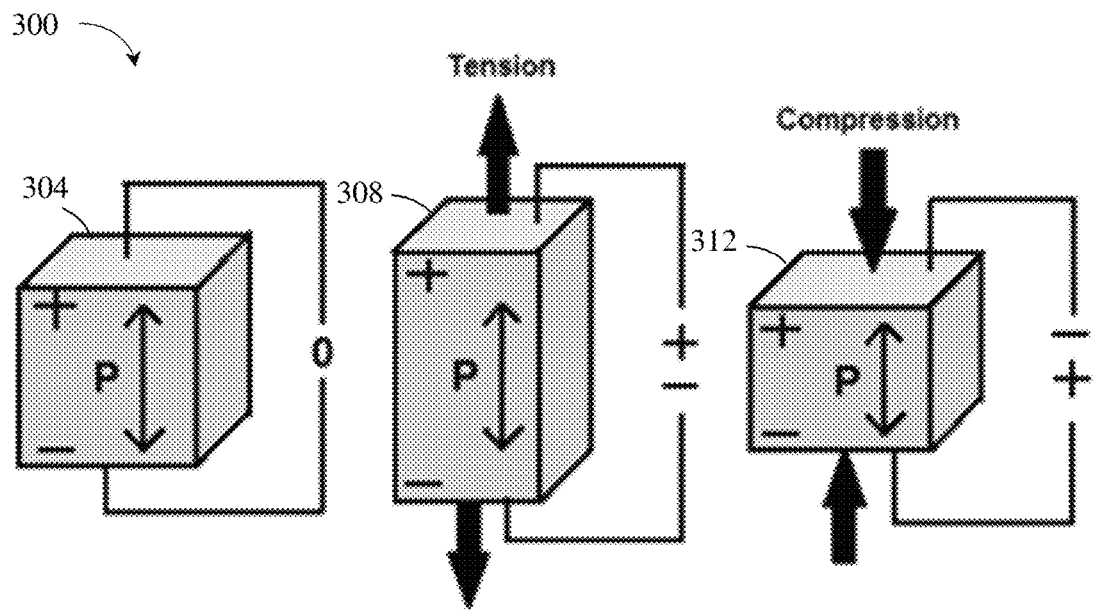
FIGS. 3A-3C are illustrations of a piezoelectric material in states of rest, tension (expansion in size) and compression (reduction in size), respectively, according to an illustrative embodiment of the invention.

To produce the raised or lowered states of the braille dots, a piezoelectric material can be used for each dot and expanded or contracted on command by applying a potential difference across the material. FIGS. 3A-3C are illustrations of a piezoelectric material in states of rest, tension (expansion in size) and compression (reduction in size), respectively, according to an illustrative embodiment of the invention. Piezoelectric material 304 is in a state of rest, which corresponds to a voltage or potential difference of zero applied across the material. Piezoelectric material 308 is in a state of tension (expansion in size), which corresponds to a positive voltage or potential difference applied across the material. Piezoelectric material 312 is in a state of compression (reduction in size), which corresponds to a negative voltage or potential difference applied across the material. The length of the expansion or contraction of the piezoelectric material 304 can vary according to the magnitude of the potential difference applied.

Figure 4:
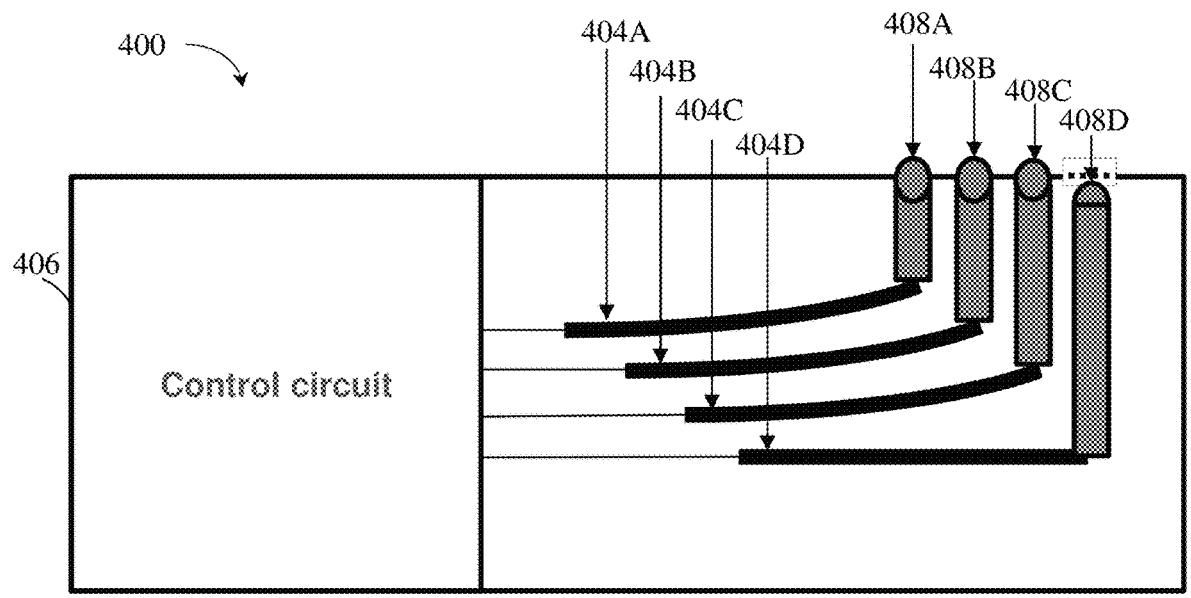
FIG. 4 is an illustration of a braille dot cantilever system using piezoelectric actuators, according to an illustrative embodiment of the invention.

FIG. 4 is an illustration of a braille dot cantilever system 400 using piezoelectric actuators 404A-D, according to an illustrative embodiment of the invention. The piezoelectric actuators 404A-D receive electrical signals from the processor 104 (e.g., via circuitry 406) and correspondingly raise or lower the linked braille dots 408A-408D, thus displaying braille information in accordance with processing operations performed by the processor 104. FIG. 4 shows just one possibility of implementing the electromechanical technology shown and described in FIGS. 3A-3C, and other implementations are possible. In some embodiments, the piezoelectric actuators 404A-D are bimorph benders, which can selectively respond to different electric signals by adopting different states, e.g., they can bend up to raise or bend down to lower the linked braille dots. As shown, actuators 404A-C are given electric signals and bend upward to raise their corresponding braille dots 408A-C, and actuator 404D is not given an electric signal, which keeps its corresponding braille dot 408D bent downward in a lowered state.

Figure 5A:
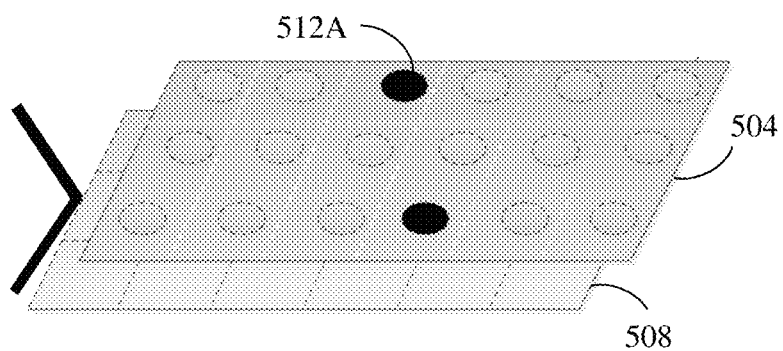
FIG. 5A is a perspective-view illustration of a surface layer and a subsurface layer including electrodes of a braille display unit, according to an illustrative embodiment of the invention.

FIG. 5A is a perspective-view illustration of a surface layer 504 and a subsurface layer 508 including electrodes of a braille display unit (e.g., the braille display unit 108 shown and described above in FIG. 1), according to an illustrative embodiment of the invention. These layers 504, 508 can form an interactive unit overlaying the braille dot display systems described above within the braille display unit 108. The surface layer 504 can be used for displaying braille information and sensing tactile contact by a user, while the subsurface layer 508 can be in physical communication with the surface layer 504 and can include electrodes for detecting a capacitance change caused by the tactile contact by the user, the capacitance change corresponding to a position of the tactile contact by the user. In some embodiments, the braille cell unit includes an electroactive polymer for displaying braille text, and the interactive unit uses projected capacitive technology (PCT) for receiving the tactile contact by the user. Traditional mobile phone technology can use PCT as a display technology, but in those cases the top layer is typically glass, into which it is difficult to bore holes, and which can create difficulties for determining a touch position for visual impairment applications. In the present invention, using PET as the top layer can eliminate these issues.

Figure 5B:
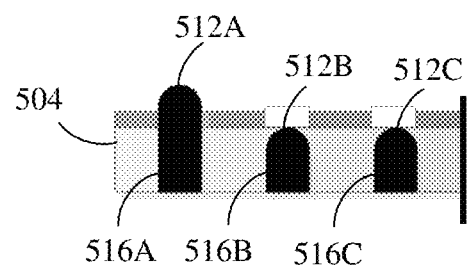
FIG. 5B is a side-view illustration of a surface layer and a subsurface layer of a braille display unit corresponding to one braille cell, according to an illustrative embodiment of the invention.

FIG. 5B is a side-view illustration of the surface layer 504 and the subsurface layer 508 of a braille display unit corresponding to one braille cell, according to an illustrative embodiment of the invention. In this view, it is clear that braille dot or protuberance 512A is raised while braille dots 512B-C are lowered. In some embodiments, the surface layer 504 is a glass or a plastic, e.g., a polyethylene terephthalate (PET) plastic. In some embodiments, since it is not necessary for the surface layer 504 to be transparent, using PET makes it easier to create bores or holes needed to accommodate the raised braille dots. Such materials can be used to form the braille cells used in the interactive display unit. In some embodiments, the interactive unit includes a set of bores 516A-C sized to at least partially surround a corresponding set of protuberances (or braille dots, e.g., braille dots 512A-C) of the braille cell unit, each protuberance in the set of protuberances capable of assuming a raised state or a lowered state.

Figure 6:
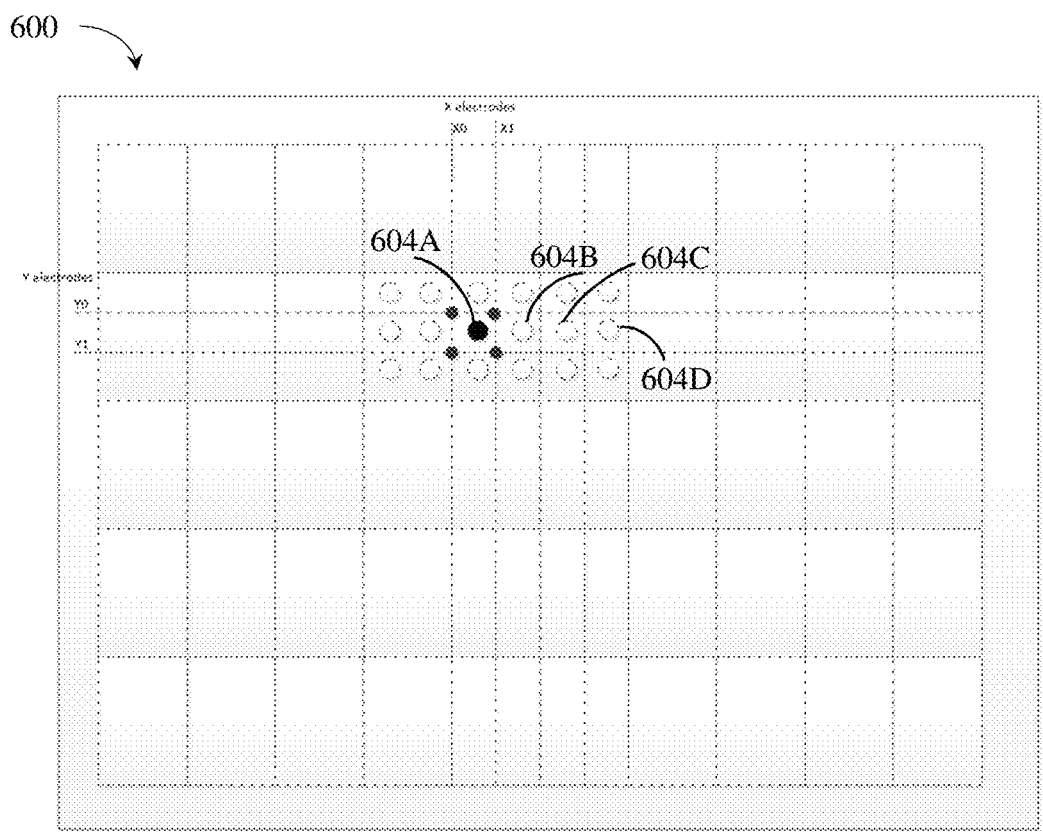
FIG. 6 is an illustration of a braille display unit showing positioning of electrodes relative to braille dots, according to an illustrative embodiment of the invention.

FIG. 6 is an illustration of a braille display unit 600 showing positioning of electrodes (e.g., X0, X1, Y0, Y1) relative to braille dots (e.g., 604A-D), according to an illustrative embodiment of the invention. In some embodiments, the subsurface layer includes first and second electrodes X0, X1 spaced along a first axis (x-axis) and third and fourth electrodes (Y0, Y1) spaced along a second axis (y-axis), the first axis perpendicular to the second axis, the first and second axes defining a surface plane of the subsurface layer. In some embodiments, the display unit is configured to display three or more lines of braille text (e.g., five lines of braille text as shown). In some embodiments, the processor is configured to receive the capacitance change detected by the subsurface layer and to generate an electronic output, the electronic output usable to assist the user in understanding information displayed by the display unit.

The electrodes X0, X1, Y0, Y1 are then placed or laid between different braille dots (e.g., 604A-D). For example, electrodes X0, X1 are placed along the X-axis, and electrodes Y0, Y1 are placed along the Y axis to create four grid lines having four intersections that form a square around braille dot 604A. In other words, each protuberance is enclosed by four points of intersection formed on a rectangular electrode grid, e.g., as braille dot 604A is enclosed as shown by the intersections of: (i) X0 and Y0; (ii) X1 and Y0; X1 and Y1; and (iv) X0 and Y1. When a user touches the braille dot 604A, the touch position can be determined, as vertical electrodes X0, X1 will detect a capacitance change, and horizontal electrodes Y0, Y1 will also detect a capacitance change. From that information, the processor can determine a touch position of the finger (e.g., at the intersections of X0, X1, Y0, Y1). From the finger touch position, a signal can be relayed to the processor and can be used in many operations on the device, as in a cellular phone, such as tap to read out chart data, add a bookmark to text, use two fingers to zoom in or out, or scroll along X or Y axes to see more chart data. In some embodiments, the tactile contact is at least one of a tap, a double-click, a slide, a swipe, a flick, or a pinch by the user.

Figure 7:
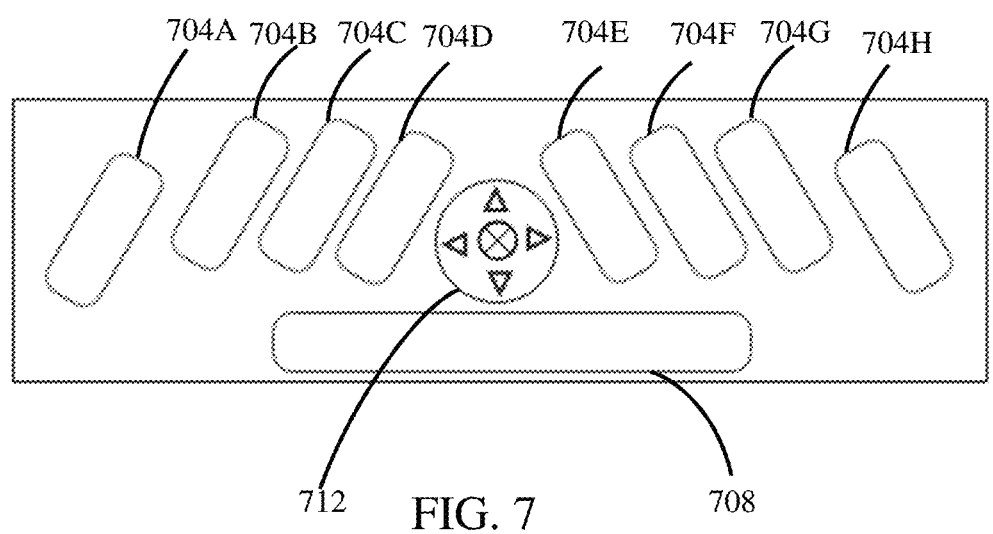
FIG. 7 is an illustration of a braille keyboard having eight keys, one spacebar and one arrow ball, according to an illustrative embodiment of the invention.

FIG. 7 is an illustration of a braille keyboard 700 having eight keys 704A-H, one spacebar 708 and one arrow ball 712, according to an illustrative embodiment of the invention. The braille keyboard 700 can be used to convey certain types of information more easily conveyed via keyboard, for example braille characters or an intent to scroll. The braille keyboard 700 can be any one of many devices known in the art. The keys 704A-H and the spacebar 708 can be standard braille keyboard components. An additional arrow ball 712 can also be added to help users understand certain aspects of displayed information, e.g., graphs. For example, the arrow ball 712 can help the user: (1) zoom in on the graph when the user presses the "up" arrow ball key along with a dot in the braille display; (2) zoom out on the graph when the user presses down the arrow ball key along with a dot in the braille display; (3) move left on the graph when the user presses the left arrow key; (4) move right on the graph when the user presses the right arrow key.

Figure 8A:
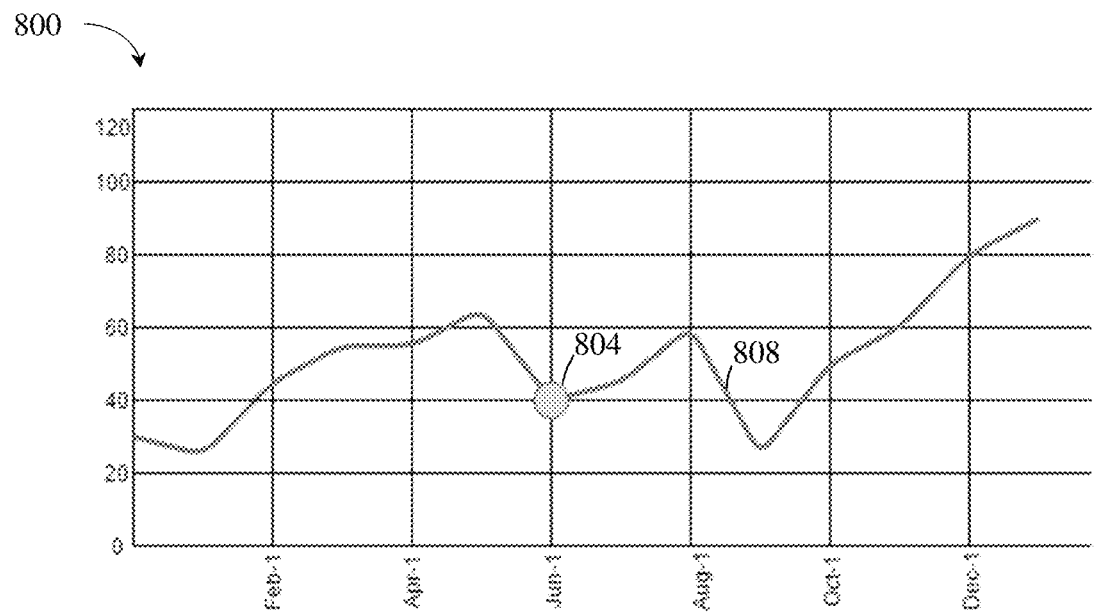
FIG. 8A is a line graph showing numerical data over a period of time, according to an illustrative embodiment of the invention.

In some embodiments, because the braille display's resolution is not very high, special chart display methods for blind individuals on the braille display are adopted. For example, when chart data are obtained, the data can be scaled and mapped onto the braille display to show the whole diagram. When a user taps on the dot, the device can speak out data corresponding to that point. For example, FIG. 8A is a line graph 800 showing numerical data over a period of time, according to an illustrative embodiment of the invention. The line graph 800 includes a dot 804 and a trend line 808. The user can tap the dot 804 (e.g., double-click the dot) and the device can speak aloud corresponding data for the dot. For example, after the user touches the dot 804, the device can speak aloud, "On June 1, the data value is 40."

Figure 8B:
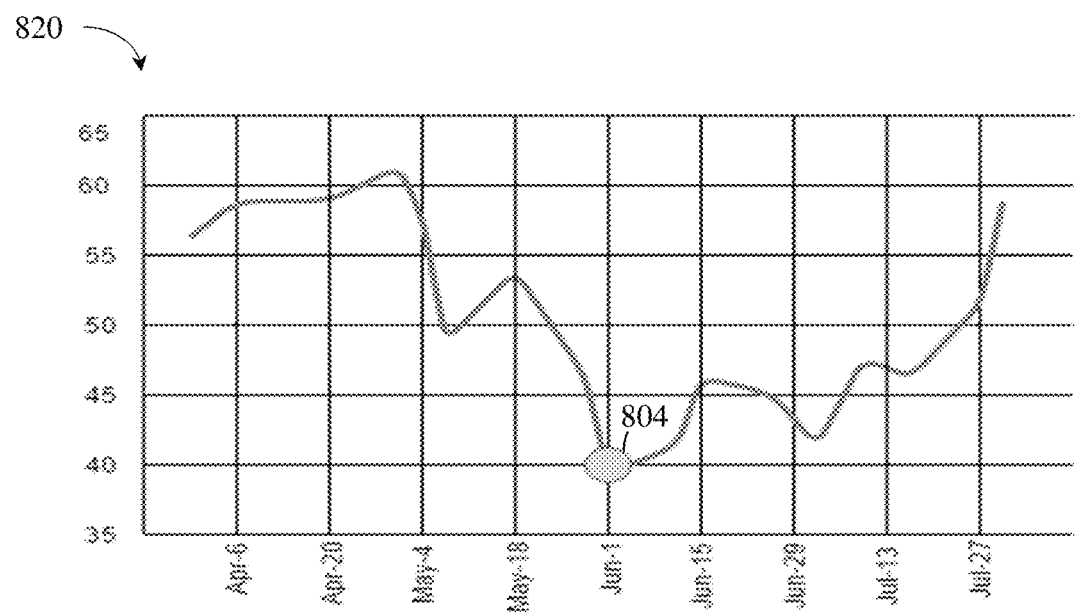
FIG. 8B is a zoomed-in view of the line graph of FIG. 8A, according to an illustrative embodiment of the invention.

A user can also zoom in on the chart directly within the braille display unit. FIG. 8B is a zoomed-in view 820 of the line graph of FIG. 8A, according to an illustrative embodiment of the invention. A user can tap on the dot 804 of the chart and press the "up" arrow on the arrow ball key of the braille keyboard, and the device can refresh the display screen to zoom in based on the dot 804 that the user taps (e.g., displaying the screen shown as FIG. 8B as a result). The chart can be centered or loosely centered in at least one of the x or y directions around the dot 804 that the user taps. The unit of data on the time axis can be lowered, e.g., from one month to two weeks as shown. In addition, the vertical coordinate can be changed, e.g., by a maximum and/or a minimum value in the period. In some embodiments, the speaker of the system can read aloud the bottom and top values shown to the user. The horizontal coordinate can be changed by the date period, and the speaker can speak out the first date and the last date shown to the user. In addition, the device can be capable of zooming out, e.g., following an opposite procedure to the zoom in function for a user to see a trend over a greater period of time.

Figure 8C:
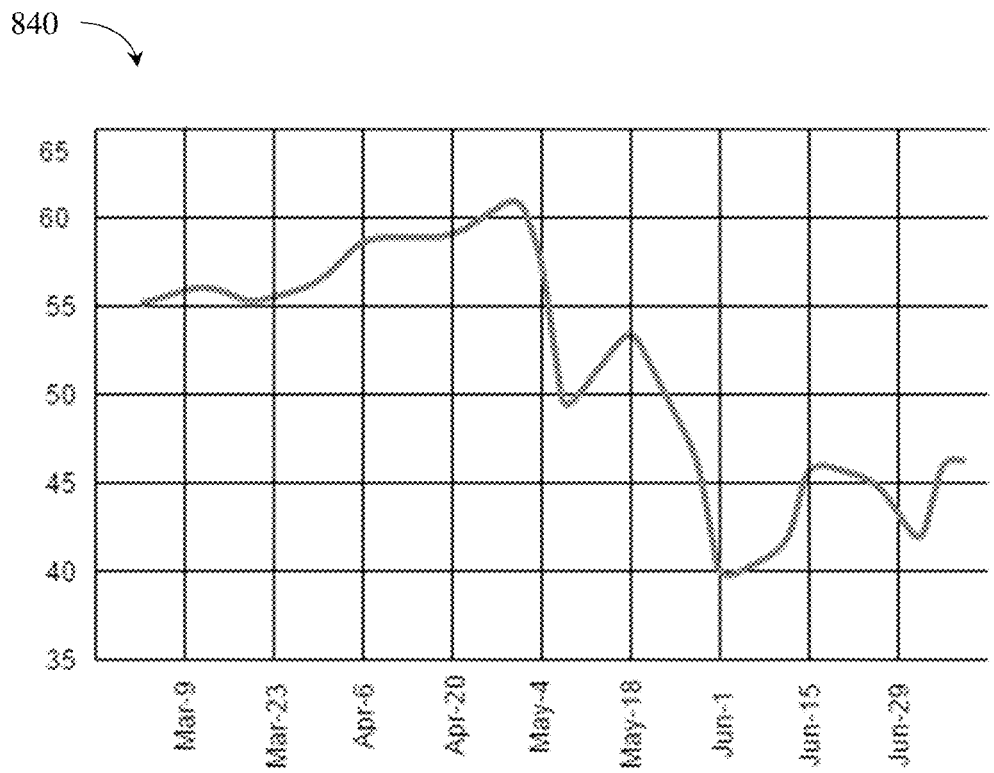
FIG. 8C is a zoomed-in view of the line graph of FIG. 8A showing a similar zoom scale as FIG. 8B but an earlier range of times relative to FIG. 8B, according to an illustrative embodiment of the invention.

In some embodiments, the braille display unit can show historical data for the chart. For example, a user can press the "right" arrow on the arrow ball key of the braille keyboard if the user wants to see the historical data, and the device can refresh the display screen to show previous data in time in the zoomed-in view. FIG. 8C is a zoomed-in view 840 of the line graph of FIG. 8A showing a similar zoom scale as FIG. 8B but for an earlier range of times relative to FIG. 8B, according to an illustrative embodiment of the invention. This chart shows the data trend from April 6 to July 27, but if the user wants to know the historical data, the user can press the "right" arrow to display the historical data. In response, the chart will be moved right, with the screen refreshed. In some embodiments, the chart can be moved right one third of an x-axis length scale based on the current maximum unit. In some embodiments, the vertical coordinate is changed by a maximum and/or a minimum value in the period. In some embodiments, the speaker can speak out the bottom and top values. In some embodiments, the horizontal coordinate is changed by the date period, and the speaker reads aloud the first and the last dates.

The braille display device can also show the latest data available within the chart. The user can press the "left" arrow on the arrow ball key if the user wants to know the historical data, and the device will refresh the display screen. For example, based on FIG. 8C, the user can know the date trend from March $9^{th}$ to June $29^{th}$, and if the user wants to know the data next in line, the user can press the "left" arrow to display it. The chart will be moved left, e.g., by one third based on the current unit. The vertical coordinate can then be changed by a maximum and/or a minimum value in the period. The speaker can then speak out the bottom and top values, and the horizontal coordinate can be changed by the date period. The speaker can then speak out the first and last date.

Figure 9A:
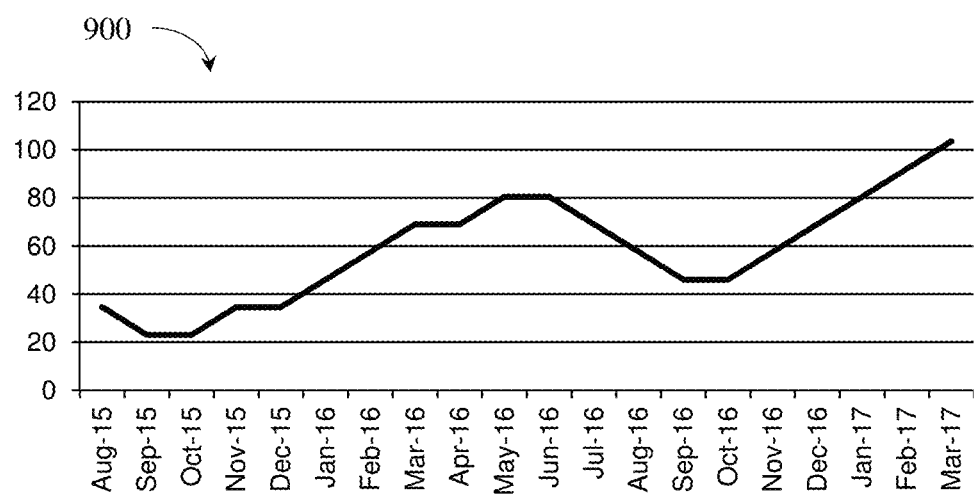
FIG. 9A shows a line graph showing stock price versus time, according to an illustrative embodiment of the invention.
Figure 9B:
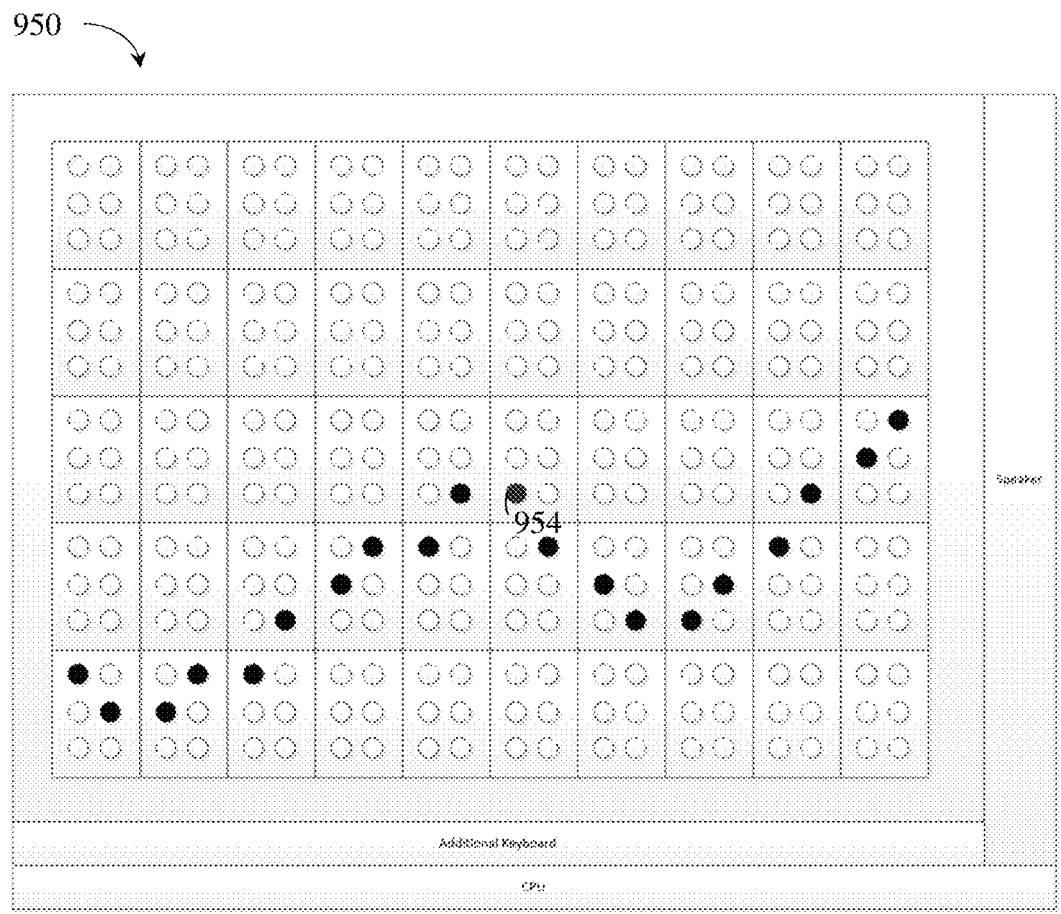
FIG. 9B is an illustration of the line graph of FIG. 9A as rendered on an interactive braille display system, according to an illustrative embodiment of the invention.

In some embodiments, the braille display unit can convert chart data (e.g., a line graph display) to a simplified rendering using braille dots. Because the braille display resolution is not very high, chart data can be scaled and mapped onto the braille display to show the whole diagram. In one example, assume that the width of the graph is Gw, the height of the graph is Gh, the width of the braille display is Bw, and the height of the braille display is Bh. Let (Gx, Gy) represent a point in a braille graph, and let (Bx, By) represent a point in the braille display. The interval of the braille display dots is I, and in the braille display, each row contains (X=Bw/I) dots and each column contains (Y=Bh/I) dots. A grid for a graph can then be calculated and scaled by the braille display using the formula: (Bx, By)=(Bw*Gx/Gw, Bh*Gy/Gh), where Bx and By are rounded to the nearest integer, if they are not integers already. Then, when a user taps on a dot (e.g., double-taps it), the device can speak out the corresponding data of that point. For example, FIG. 9A shows a line graph 900 showing stock price versus time, according to an illustrative embodiment of the invention, and FIG. 9B is an illustration 950 of the line graph of FIG. 9A as rendered on an interactive braille display system, according to an illustrative embodiment of the invention. When the user taps on the dot 954, the speaker can read out, for example, "The price on June 2016 was $80."

Figure 10A:
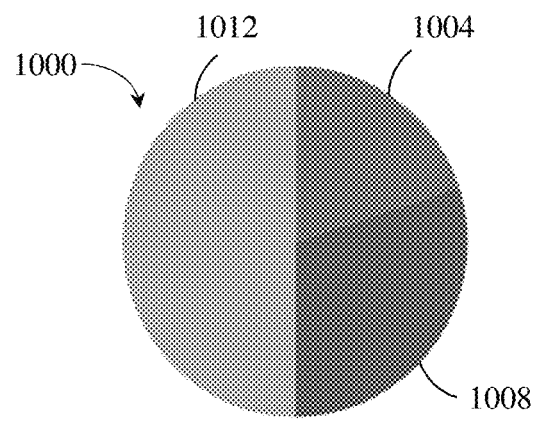
FIG. 10A shows a pie chart having three unequal segments each representing a data series, according to an illustrative embodiment of the invention.
Figure 10B:
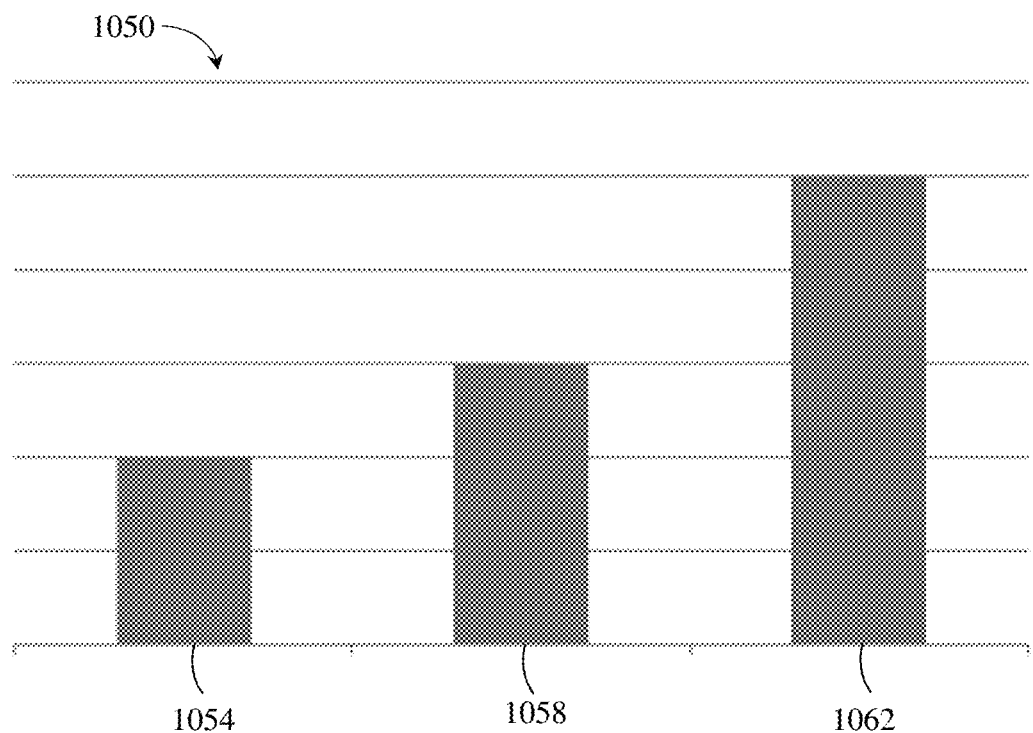
FIG. 10B is a bar chart representing a conversion of the series shown in the pie chart of FIG. 10A, according to an illustrative embodiment of the invention.

The limitations of the braille display unit may also make it difficult to display all information in one chart in a way that is readily comprehensible to a blind user. For example, if a chart contains two lines and these two lines have an intersection, then if both lines are displayed on the braille display, the user may have difficulty distinguishing the two lines and/or discerning the intersection. One solution to that problem is to split the graph data, if it has several series, into one dedicated graph for each series, and to render a separate screen depicting each separate graph on the braille display. For example, FIG. 10A shows a pie chart 1000 having three unequal segments 1004, 1008, 1012 each representing a data series, according to an illustrative embodiment of the invention. Each proportion of the pie chart 1000 can be converted to a corresponding value on a bar chart (e.g., as shown in FIG. 10B, according to an illustrative embodiment of the invention), which will be easier for a blind individual to distinguish on a braille display. FIG. 10B shows data series 1054, 1058, 1062 in bar graph form, which correspond to data segments 1004, 1008, and 1012, respectively, as shown in the pie chart 1000.

Figure 11A:
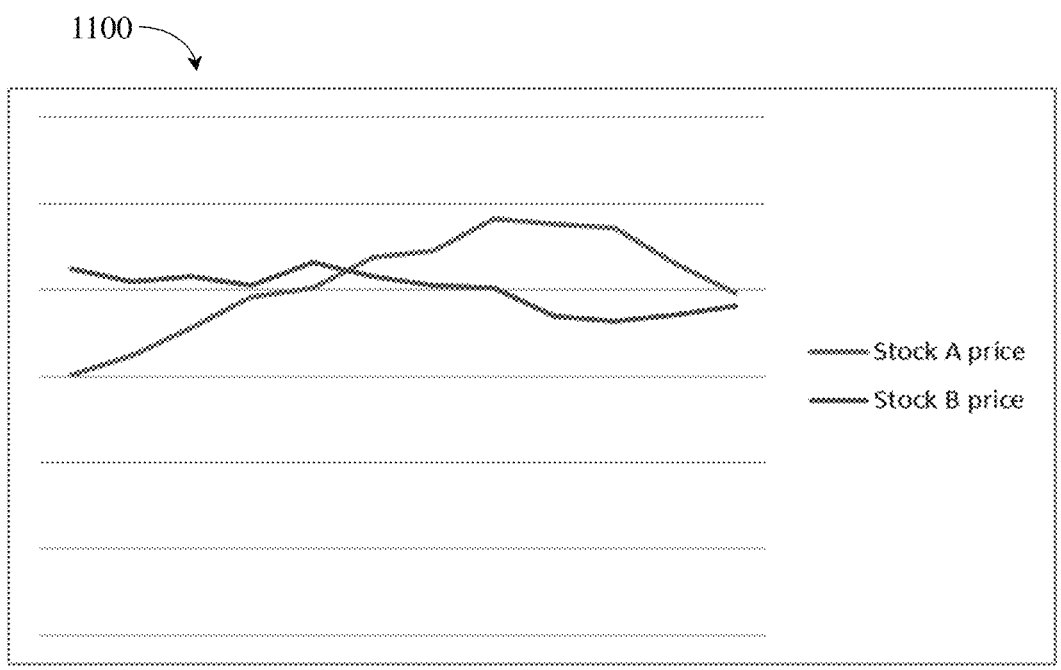
FIG. 11A shows a line graph depicting stock price vs. time for stock A and stock B, according to an illustrative embodiment of the invention.
Figure 11B:
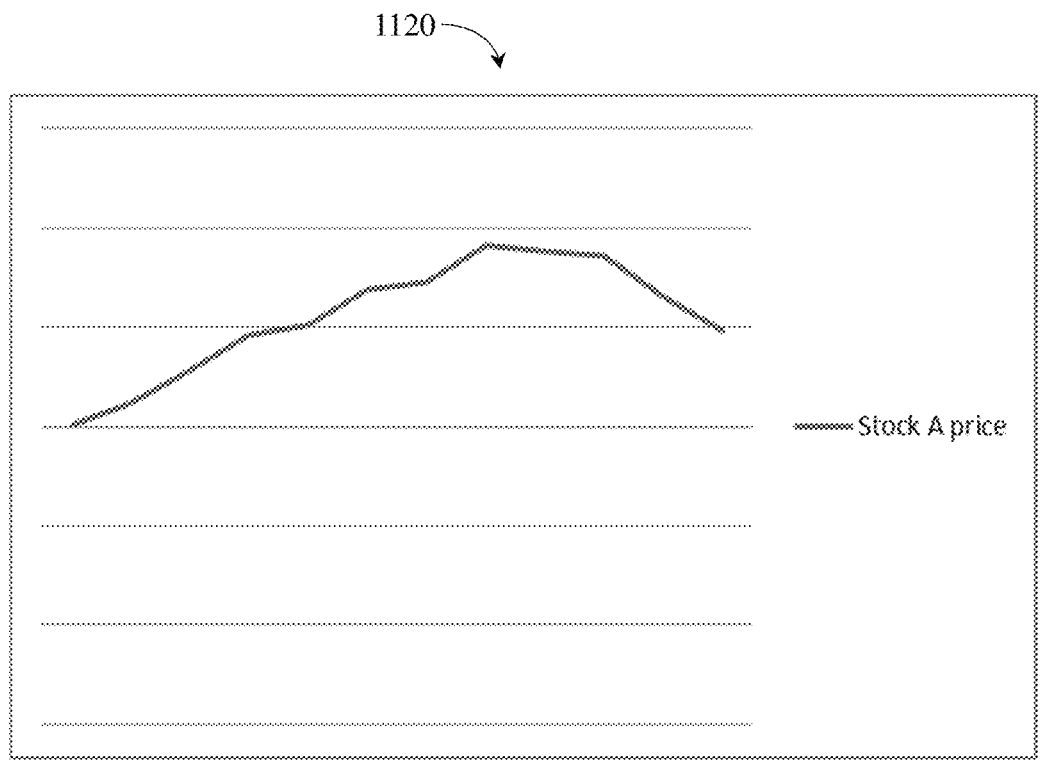
FIG. 11B shows a partial line graph based on FIG. 11A depicting stock price vs. time for only stock A, according to an illustrative embodiment of the invention.
Figure 11C:
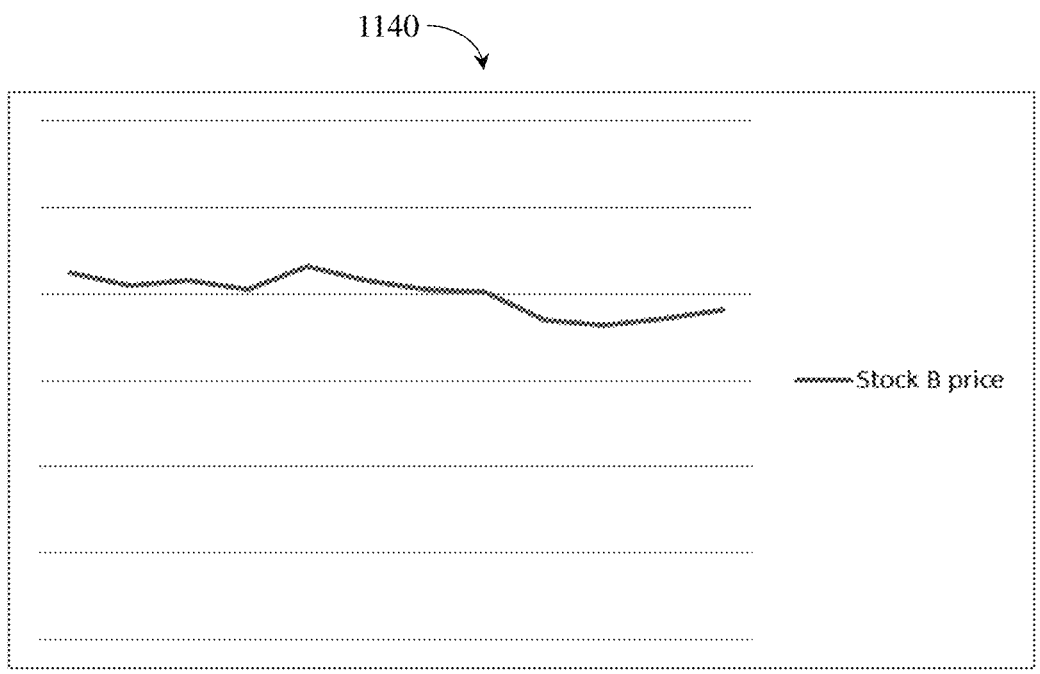
FIG. 11C shows a partial line graph based on FIG. 11A depicting stock price vs. time for only stock B, according to an illustrative embodiment of the invention.

Similarly, for a line chart that has two or more series, the data can be split into charts that represent only one series each. FIG. 11A shows a line graph 1100 depicting stock price vs. time for stock A and stock B, according to an illustrative embodiment of the invention. On the other hand, FIG. 11B shows a partial line graph 1120 based on FIG. 11A depicting stock price vs. time for only stock A, according to an illustrative embodiment of the invention, and FIG. 11C shows a partial line graph 1140 based on FIG. 11A depicting stock price vs. time for only stock B, according to an illustrative embodiment of the invention. Using the split renderings, a blind individual can more readily discern the details of each individual trend, and will be less susceptible to confusion regarding the details of that particular trend vis-à-vis the other.

More generally, the braille display can display many forms of information according to similar methods. In some embodiments, the information is investment or financial data. In some embodiments, the information is chart data. In some embodiments, the chart data has two or more chart data series and the processor is configured to display each chart data series separately.

In some embodiments, the chart data includes a line graph having two or more lines and the processor is configured to display each line individually on the display unit. In some embodiments, the chart data includes a pie chart and the processor is configured to convert the pie chart data to bar chart data for display on the display unit. In some embodiments, the processor is configured to generate a magnified display of the chart data responsive to the tactile contact of the user. In some embodiments, the processor is configured to cause the display unit to pan within the chart responsive to a user command.

Figure 12:
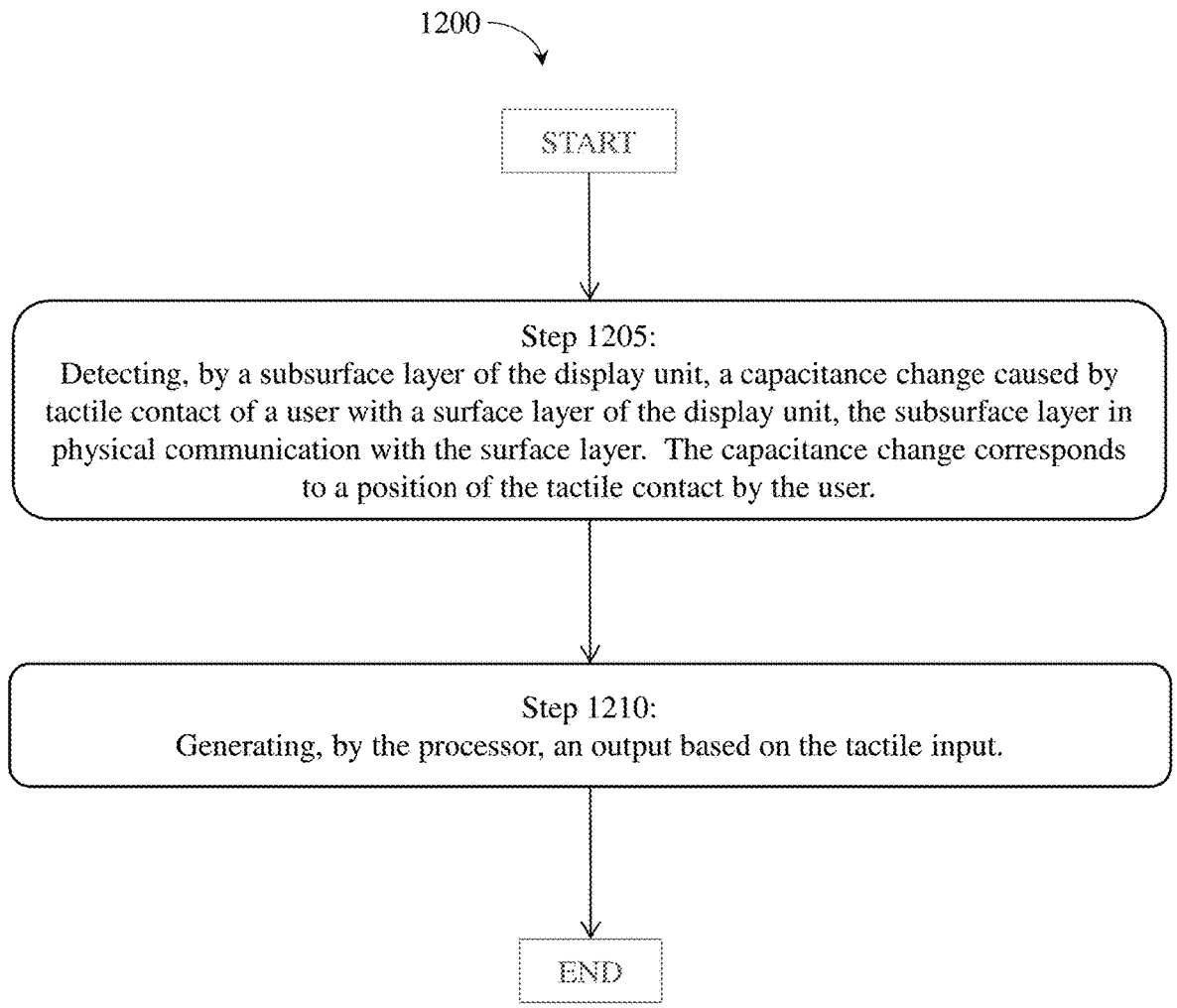
FIG. 12 is flow chart of a computerized method of displaying braille information on a display unit having a braille cell and an interactive unit in physical contact with the braille cell, according to an illustrative embodiment of the invention.

FIG. 12 is flow chart of a computerized method of displaying braille information on a display unit having a braille cell and an interactive unit in physical contact with the braille cell, according to an illustrative embodiment of the invention. The computerized method includes a first step 1205 of detecting, by a subsurface layer of the display unit, a capacitance change caused by tactile contact of a user with a surface layer of the display unit, the subsurface layer in physical communication with the surface layer. The computerized method includes a second step 1210 of generating, by the processor, an output based on the tactile input. The capacitance change corresponds to a position of the tactile contact by the user.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:
1. An interactive braille display system comprising:
   a processor; and
   a display unit in electronic communication with the processor, the display unit including a braille cell unit and an interactive unit in physical contact with the braille cell unit, the interactive unit comprising:
      a surface layer for displaying braille information and sensing tactile contact by a user; and
      a subsurface layer in physical communication with the surface layer, the subsurface layer including electrodes for detecting a capacitance change caused by the tactile contact by the user, wherein the capacitance change corresponds to a position of the tactile contact by the user,
   wherein the braille information includes chart data comprised of a plurality of data points at a first resolution that are scaled and mapped to a second resolution of the display unit in order to display an entire graph of the chart data on the surface layer of the display unit; and
   the processor is configured to receive the capacitance change detected by the subsurface layer and to generate an electronic output, the electronic output usable to assist the user in understanding information displayed by the display unit.

2. The system of claim 1 wherein the subsurface layer includes first and second electrodes spaced along a first axis and third and fourth electrodes spaced along a second axis, the first axis perpendicular to the second axis, the first and second axes defining a surface plane of the subsurface layer.

3. The system of claim 1 wherein the interactive unit includes a set of bores sized to at least partially surround a corresponding set of protuberances of the braille cell unit, each protuberance in the set of protuberances capable of assuming a raised state or a lowered state.

4. The system of claim 1 wherein the display unit is configured to display three or more lines of braille text.

5. The system of claim 1 wherein the tactile contact is at least one of a tap, a double-click, a slide, a swipe, a flick, or a pinch by the user.

6. The system of claim 1 wherein the information is investment or financial data.

7. The system of claim 1 wherein the chart data has two or more chart data series and the processor is configured to display each chart data series separately.

8. The system of claim 1 wherein the chart data includes a line graph having two or more lines and the processor is configured to display each line individually on the display unit.

9. The system of claim 1 wherein the processor is configured to generate a magnified display of the chart data responsive to the tactile contact of the user.

10. The system of claim 1 further including a speaker in electrical communication with the processor, the processor configured to provide to the speaker audio explaining the braille information.

11. The system of claim 1 further including a braille keyboard in electrical communication with the processor, the braille keyboard including multiple function keys for receiving additional user input.

12. The system of claim 1 wherein the braille cell unit includes an electroactive polymer for displaying braille text and the interactive unit uses projected capacitive technology for receiving the tactile contact by the user.

13. The system of claim 1 wherein the surface layer includes a plastic material.

14. The system of claim 1 wherein each protuberance is enclosed by four points of intersection formed on a rectangular electrode grid and each point of intersection comprises an electrode.

15. The system of claim 1 further including a microphone in electrical communication with the processor, the microphone configured to receive a user voice command, the processor configured to produce an output responsive to the voice command.

16. A computerized method of displaying braille information on a display unit having a braille cell and an interactive unit in physical contact with the braille cell, the computerized method comprising:
    detecting, by a subsurface layer of the display unit, a capacitance change caused by tactile contact of a user with a surface layer of the display unit, the subsurface layer in physical communication with the surface layer; and
    generating, by the processor, an output based on the tactile input, wherein the capacitance change corresponds to a position of the tactile contact by the user,
    wherein the braille information includes chart data comprised of a plurality of data points at a first resolution that are scaled and mapped to a second resolution of the display unit in order to display an entire graph of the chart data on the surface layer of the display unit; and
    receiving, by the processor, the capacitance change detected by the subsurface layer and generating an electronic output, the electronic output usable to assist the user in understanding information displayed by the display unit.

17. The method of claim 16 wherein the subsurface layer includes first and second electrodes spaced along a first axis and third and fourth electrodes spaced along a second axis, the first axis perpendicular to the second axis, the first and second axes defining a surface plane of the subsurface layer.

18. The method of claim 16 wherein the interactive unit includes a set of bores sized to at least partially surround a corresponding set of protuberances of the braille cell unit, each protuberance in the set of protuberances capable of assuming a raised state or a lowered state.

19. The method of claim 16 wherein the display unit is configured to display three or more lines of braille text.

20. The method of claim 16 wherein the tactile contact is at least one of a tap, a double-click, a slide, a swipe, a flick, or a pinch by the user.

21. The method of claim 16 wherein the information is investment or financial data.

22. The method of claim 16 wherein the chart data has two or more chart data series and the processor is configured to display an entire graph for each chart data series separately.

23. The method of claim 16 wherein the chart data includes a line graph having two or more lines and the processor is configured to display an individual line graph for each of the two or more lines individually on the display unit.

24. The method of claim 16 wherein the processor is configured to generate a magnified display of the chart data responsive to the tactile contact of the user.

25. The method of claim 16 further including a speaker in electrical communication with the processor, the processor configured to provide to the speaker audio explaining the braille information.

26. The method of claim 16 further including a braille keyboard in electrical communication with the processor, the braille keyboard including multiple function keys for receiving additional user input.

27. The method of claim 16 wherein the braille cell unit includes an electroactive polymer for displaying braille text and the interactive unit uses projected capacitive technology for receiving the tactile contact by the user.

28. The method of claim 16 wherein the surface layer includes a plastic material.

29. The method of claim 16 wherein each protuberance is enclosed by four points of intersection formed on a rectangular electrode grid and each point of intersection comprises an electrode.

30. The method of claim 16 further including a microphone in electrical communication with the processor, the microphone configured to receive a user voice command, the processor configured to produce an output responsive to the voice command.

* * * * *